(12) United States Patent
Saito

(10) Patent No.: US 10,079,102 B2
(45) Date of Patent: Sep. 18, 2018

(54) METALLIZED FILM CAPACITOR

(71) Applicant: TOYOTA JIDOSHA KABUSHIKI KAISHA, Toyota-shi, Aichi-ken (JP)

(72) Inventor: Takahiro Saito, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 33 days.

(21) Appl. No.: 15/229,729

(22) Filed: Aug. 5, 2016

(65) Prior Publication Data

US 2017/0047166 A1    Feb. 16, 2017

(30) Foreign Application Priority Data

Aug. 10, 2015 (JP) .................. 2015-158170

(51) Int. Cl.
| | |
|---|---|
| *H01G 4/30* | (2006.01) |
| *H01G 4/012* | (2006.01) |
| *H01G 4/015* | (2006.01) |
| *H01G 4/18* | (2006.01) |
| *H01G 4/32* | (2006.01) |

(52) U.S. Cl.
CPC ............. *H01G 4/30* (2013.01); *H01G 4/012* (2013.01); *H01G 4/015* (2013.01); *H01G 4/18* (2013.01); *H01G 4/32* (2013.01)

(58) Field of Classification Search
CPC .......... H01G 4/30; H01G 4/012; H01G 4/015; H01G 4/18; H01G 4/32

USPC ..................................................... 361/275.4
See application file for complete search history.

(56) References Cited

U.S. PATENT DOCUMENTS

| | | | |
|---|---|---|---|
| 2012/0075769 A1* | 3/2012 | Lobo ..................... | H01G 4/008 |
| | | | 361/301.5 |
| 2015/0138691 A1* | 5/2015 | Takeoka ................. | H01G 4/015 |
| | | | 361/304 |

FOREIGN PATENT DOCUMENTS

| | | |
|---|---|---|
| JP | 2004-200588 A | 7/2004 |
| JP | 2010-272580 A | 12/2010 |
| JP | 2013-219094 A | 10/2013 |

* cited by examiner

*Primary Examiner* — Michael P McFadden
(74) *Attorney, Agent, or Firm* — Sughrue Mion, PLLC

(57) ABSTRACT

A metallized film capacitor includes a metallized film columnar body in which metallized films are stacked or wound, an external lead-out terminal, and a metal sprayed portion to which the external lead-out terminal is joined and that is provided in the metallized film columnar body. The metallized film columnar body includes (i) a metal deposition film includes (a) a non-slit-forming region that does not includes a non-deposition slit and (b) a slit-forming region including plural non-deposition slits and fuse portions that are present between the non-deposition slits, (ii) insulating non-melting films that are provided on at least the fuse portions closest to the non-slit-forming region and do not melt due to heat generated from fuse portions, and (iii) a dielectric film.

6 Claims, 6 Drawing Sheets

METALLIZED FILM CAPACITOR

INCORPORATION BY REFERENCE

The disclosure of Japanese Patent Application No. 2015-158170 filed on Aug. 10, 2015 including the specification, drawings and abstract is incorporated herein by reference in its entirety.

BACKGROUND

1. Field Disclosure

The present disclosure relates to a metallized film capacitor.

2. Description of Related Art

For example, in an inverter circuit for a vehicle, a metallized film capacitor having a high withstand voltage and satisfactory temperature characteristics and frequency characteristics is used. As a metallized film capacitor of the related art, a wound metallized film capacitor in which metallized films are wound or a stacked metallized film capacitor in which metallized films are stacked is generally used. Further, a metallized film capacitor having a self-healing function of eliminating the breakdown state of the capacitor has been developed. The configuration of the metallized film capacitor having a self-healing function will be described with reference to FIGS. 5 and 6.

FIG. 5 shows metallized films c1, c2 of two kinds. The metallized film c1 includes: a dielectric film a1; and a metal deposition film b1 that includes non-deposition slits s and an insulation margin mg. Likewise, the metallized film c2 includes: a dielectric film a2; and a metal deposition film b2 that includes non-deposition slits s and an insulation margin mg. The insulation margins mg of the metallized films c1, c2 are provided opposite to each other. Although not shown in the drawing, a metallized film capacitor may include the metallized film c1 shown in the drawing and another metallized film, the other metallized film including: a dielectric film; and a metal deposition film that includes only an insulation margin (a metal deposition film having no non-deposition slits s which is formed by so-called blanket deposition).

In the metal deposition films b1, b2 constituting the metallized films c1, c2, there are two regions including: a slit-forming region VA in which non-deposition slits s, s1 are formed; and a non-slit-forming region NA in which the non-deposition slits s, s1 are not formed. In the slit-forming regions VA, the plural non-deposition slits s, s1 are formed at intervals, and fuse portions fs, fs1 having a small width are formed between end portions of the non-deposition slits s, s1. Thus, the slit-forming regions VA are divided into plural segments sg surrounded by the respective non-deposition slits s, s1. In FIG. 5, non-deposition slits closest to the non-slit-forming region NA are shown as the non-deposition slits s1, and fuse portions closest to the non-slit-forming region NA are shown as the fuse portions fs1.

The metallized films c1, c2 are stacked such that the insulation margins mg thereof do not match with each other in a stacking direction, thereby forming a laminate d including the two metallized films. The laminate d including the two metallized films are stacked or wound as shown in FIG. 6. As a result, a metallized film columnar body K is formed. Further, metal sprayed portions e (metallicon electrodes) are formed on two opposite electrode extraction surfaces of the metallized film columnar body K, respectively. External lead-out terminals f (bus bars) are connected to the metal sprayed portions e through solder layers g. As a result, a metallized film capacitor C is formed. Japanese Patent Application Publication No. 2004-200588 (JP 2004-200588 A) discloses a metallized film capacitor which is formed by stacking or winding a laminate including two metallized film capacitors having a structure in which the two metallized film capacitors are stacked. Among the two metallized film, one metallized film includes: a metal deposition film that includes non-deposition slits and an insulation margin as shown in FIG. 5; and a dielectric film. The other metallized film includes: a metal deposition film that includes only an insulation margin; and a dielectric film.

In the metal deposition films b1, b2 of the metallized films c1, c2, an end portion opposite to the insulation margin mg is in contact with the metal sprayed portion e, whereas contact between an end portion where the insulation margin mg is present and the metal sprayed portion e is prevented by the insulation margin mg. In the metal deposition films b1, b2, an end portion in close contact with the metal sprayed portion e is a so-called heavy edge having a larger thickness than the other portions to ensure electrode contact. For example, in a case where the thickness of an ordinary portion of a metal deposition film is several tens of nanometers, the thickness of a heavy edge is adjusted to be twice the thickness of the ordinary portion. In a general configuration, the metallized film capacitor C is further accommodated in a case (not shown) and is sealed with a resin molded body (not shown) in the case.

In the metal deposition films b1, b2 constituting the metallized films c1, c2, although the metal deposition films b1, b2 are divided into plural segments sg surrounded by the plural non-deposition slits s, s1, adjacent segments sg can be electrically connected to each other through the fuse portions fs, fs1 by the fuse portions fs, fs1 (which are deposition portions) being present between the non-deposition slits s, s1.

The fuse portions fs, fs1 have a function of disconnecting electrical connection between one segment sg in the breakdown state and another segment sg adjacent thereto. That is, in a case where breakdown occurs by one segment being electrically connected to another segment sg below the segment due to, for example, a defective dielectric, the amount of current flowing to the segment sg in the breakdown state through the fuse portions fs, fs1 increases. Since the amount of current flowing through the fuse portions fs, fs1 increases, the temperature of the fuse portions fs, fs1 increases, and the metal deposition films of the fuse portions fs, fs1 are evaporated and scattered. As a result, the segment sg in the breakdown state is isolated from another segment sg adjacent thereto. A function of eliminating the breakdown state of a film capacitor by isolating one segment sg in the breakdown state from another segment sg adjacent thereto as described above is the self-healing function.

SUMMARY

Regarding the above-described increase in the amount of current flowing through the fuse portions fs, fs1, the amount of current flowing through the fuse portions fs1 closest to the non-slit-forming region NA in contact with the metal sprayed portion e is more than that flowing through the other fuse portions fs, and a thermal load is likely to be concentrated on the fuse portions fs1.

Due to the concentration of the thermal load on the fuse portions fs1 closest to the non-slit-forming region NA, the plural metallized films c1, c2 in the stacked state continuously melt (so-called multi-layer melting; the metallized films continuously melt in a region HA of FIG. 6), and this multi-layer melting may cause short-circuiting of the metallized film capacitor C.

The disclosure provides a metallized film capacitor capable of solving a problem that plural metallized films in a stacked state continuously melt due to concentration of a thermal load on fuse portions closest to a non-slit-forming region.

According to an aspect of the disclosure, there is provided a metallized film capacitor comprising:
- a metallized film columnar body in which metallized films are stacked or wound, the metallized film columnar body comprising
  - (i) a metal deposition film comprising (a) a non-slit-forming region that does not includes a non-deposition slit and (b) a slit-forming region including plural non-deposition slits and fuse portions that are present between the non-deposition slits,
  - (ii) insulating non-melting films that are provided on at least the fuse portions closest to the non-slit-forming region and do not melt due to heat generated from fuse portions, and
  - (iii) a dielectric film,
- an external lead-out terminal; and
- a metal sprayed portion to which the external lead-out terminal is joined and that is provided in the metallized film columnar body.

In the metallized film capacitor, the insulating non-melting films that do not melt due to heat generated from fuse portions closest to the non-slit-forming region are provided so as to cover at least the fuse portions closest to the non-slit-forming region. As a result, continuous melting of the metallized films in the stacked state can be eliminated, and short-circuiting caused by the melting of the metallized films can be prevented.

The slit-forming region including the non-deposition slits and the fuse portions may be formed on a surface of the dielectric film which is formed by so-called pattern deposition, and the non-slit-forming region including no non-deposition slits and no fuse portions may be formed on a surface of the dielectric film which is formed by so-called blanket deposition.

The dielectric film may be formed of, for example, polypropylene (PP), polyphenylene sulfide (PPS), or polyvinylidene fluoride (PVDF). The metal deposition film may be formed of aluminum or zinc.

Each of the metallized films, which form the metallized film columnar body by being stacked or wound, may include a dielectric film and a metal deposition film including non-deposition slits and an insulation margin. The two metallized films may be stacked such that the insulation margins thereof are provided opposite to each other. Two metallized films may be laminated, in which one of the two metallized films includes a dielectric film and a metal deposition film that includes non-deposition slits and an insulation margin, and the other metallized film includes a dielectric film and a metal deposition film including only an insulation margin (a metal deposition film including no non-deposition slits).

Regardless of which laminate of the metallized films is used, metal sprayed portions formed of zinc or the like may be formed on opposite electrode extraction surfaces of a metallized film columnar body which is prepared by winding or stacking the laminate, and external lead-out terminals formed of a rod-shaped or plate-shaped bus bar may be soldered to surfaces of the formed metal sprayed portions, thereby forming a metallized film capacitor.

The slit-forming region including the non-deposition slits and the fuse portions may be formed on a surface of the dielectric film which is formed by so-called pattern deposition, and the non-slit-forming region including no non-deposition slits and no fuse portions may be formed on a surface of the dielectric film which is formed by so-called blanket deposition.

Here, the insulating non-melting films may be formed of a fine ceramic such as barium titanate ($BaTiO_3$) or lead zirconate titanate ($Pb(Zr,Ti)O_3$). The non-melting films are insulating because a conductive non-melting film does not function as a fuse.

Examples of a method of forming the non-melting films on the fuse portions closest to the non-slit-forming region include a method of bonding separately prepared non-melting films to the fuse portions and a method of winding the non-melting films and the fuse portions together. In a case where the dielectric film is prepared through a process of applying a film material, the dielectric film can be formed using a sol-gel method, a sputtering method, or a CVD method by applying or spraying a non-melting film material to a substrate in advance before applying the film material.

Here, "the non-melting films are formed on at least the fuse portions closest to the non-slit-forming region" means that the non-melting films are formed not only on the fuse portions closest to the non-slit-forming region but also on regions at a predetermined distance from the fuse portions. The non-melting film may be formed on a single surface or two top and bottom surfaces of the fuse portion.

The non-melting films may cover the fuse portions closest to the non-slit-forming region and regions at a distance of 3 mm or more from the fuse portions closest to the non-slit-forming region. According to this configuration, melting of the metallized films caused by the concentration of the thermal load on the fuse portions and the peripheries of the fuse portions can be more efficiently prevented.

In a case where the non-melting films cover the fuse portions and the peripheral regions thereof, each of the non-melting films may have a belt shape and may cover plural fuse portions closest to the non-slit-forming region. This structure allows the non-melting films to be formed with high efficiency.

A thickness of the non-melting films may be 0.3 µm or less. The present inventors discovered that, by adjusting the thickness of the non-melting films to be 0.3 µm or less, corrugation is not likely to be formed on the dielectric film having a thickness of 2 to 5 µm.

Since the evaporation temperature of aluminum which is a general material for forming a metal deposition film is about 1000° C., a melting point of the non-melting films may be 1000° C. or higher.

A dielectric constant of the non-melting films may be equal to or higher than a dielectric constant of the dielectric film. By adjusting the dielectric constant of the non-melting films to be equal to or higher than that of the dielectric film, a slight decrease in electrostatic capacitance can be prevented.

As can be understood from the above description, in the metallized film capacitor according to the disclosure, the insulating non-melting films that do not melt due to heat generated from fuse portions closest to the non-slit-forming region are formed so as to cover at least the fuse portions closest to the non-slit-forming region. As a result, continuous melting of the metallized films in the stacked state (so-called multi-layer melting) can be eliminated, and short-circuiting caused by the continuous melting of the plural metallized films can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS (Embodiment of Metallized Film Capacitor, and First Embodiment of Metallized Films)

Figure 1:
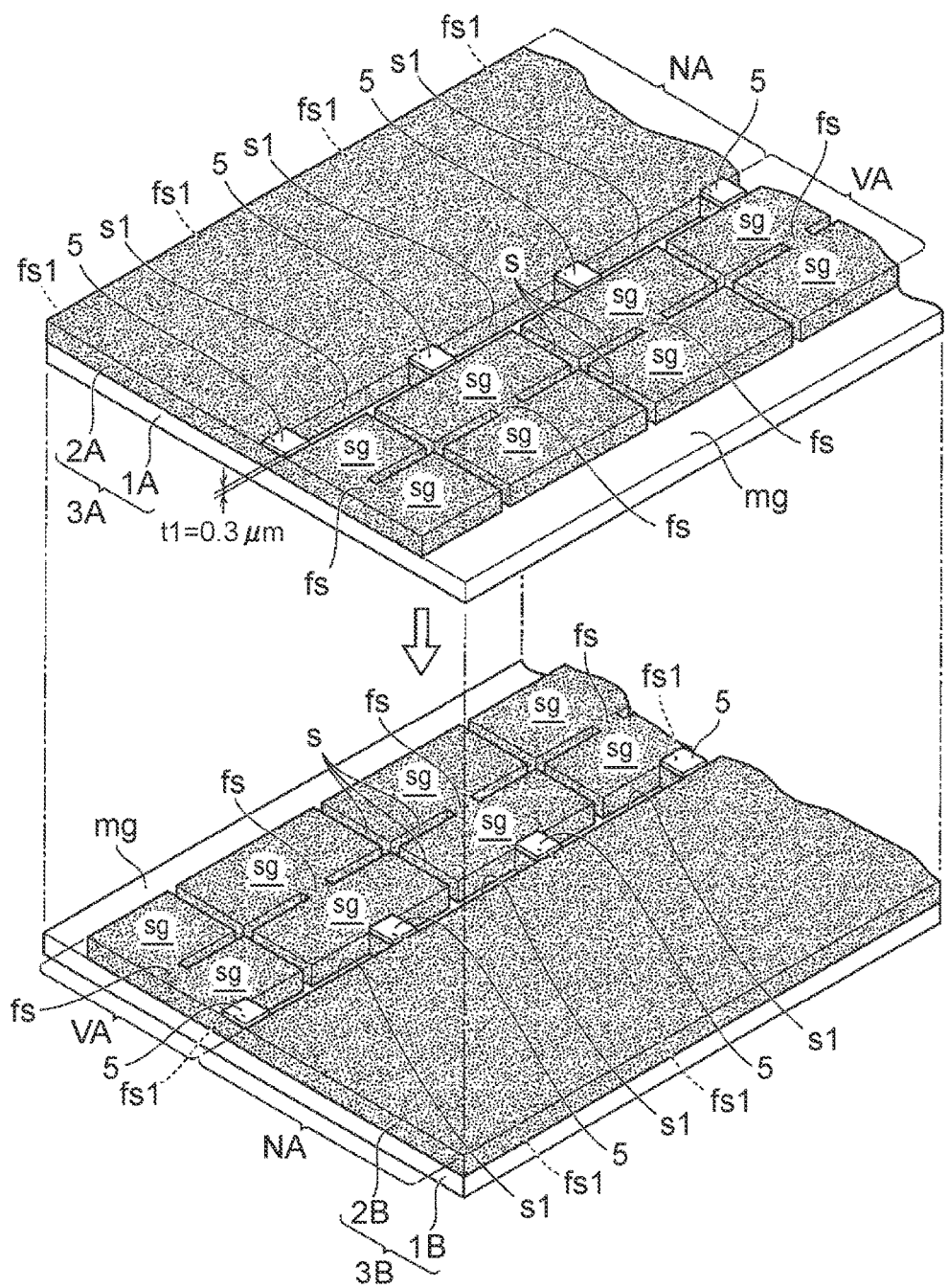
FIG. 1 is a schematic diagram showing a state of two metallized films constituting a metallized film capacitor according to a first embodiment of the disclosure before being stacked.
Figure 2:
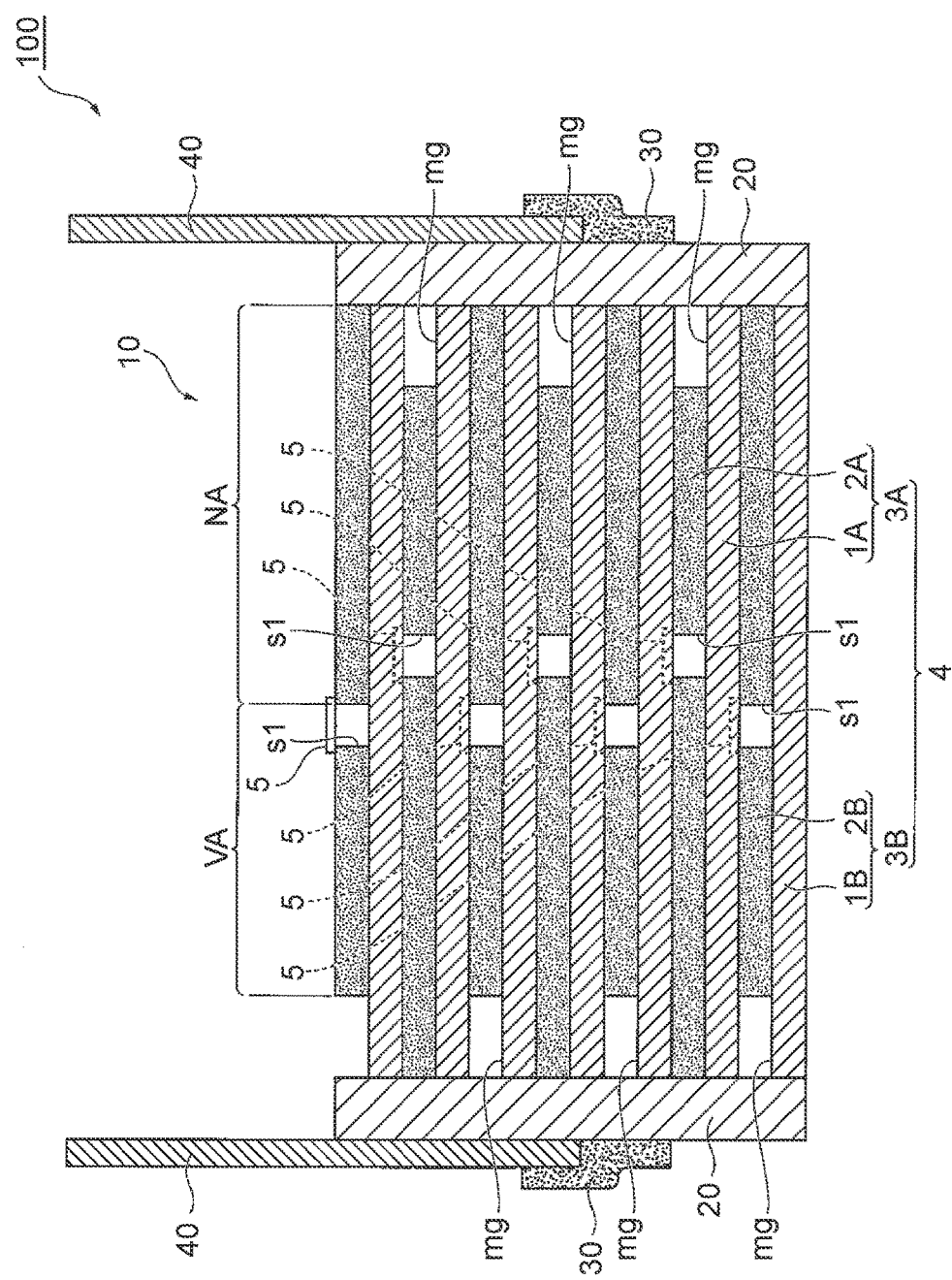
FIG. 2 is a longitudinal sectional view showing the metallized film capacitor according to the first embodiment of the disclosure.

FIG. 1 is a schematic diagram showing a state of two metallized films constituting a metallized film capacitor according to a first embodiment of the disclosure before being stacked. FIG. 2 is a longitudinal sectional view showing the metallized film capacitor according to the first embodiment of the disclosure.

As shown in FIG. 1, a metallized film capacitor 100 includes two metallized films 3A, 3B.

The metallized film 3A includes: a dielectric film 1A; and a metal deposition film 2A that includes non-deposition slits s, s1 and an insulation margin mg. Likewise, the metallized film 3B includes: a dielectric film 1B; and a metal deposition film 2B that includes non-deposition slits s, s1 and an insulation margin mg. The insulation margins mg of the metallized film 3A and 3B are provided opposite to each other.

In the metal deposition films 2A, 2B, slit-forming regions VA including the non-deposition slits s, s1 and fuse portions fs, fs1 are formed on surfaces of the dielectric films 1A, 1B which are formed by so-called pattern deposition, respectively, and non-slit-forming regions NA including no non-deposition slits s, s1 and no fuse portions fs, fs1 are formed on surfaces of the dielectric films 1A, 1B which are formed by so-called blanket deposition, respectively. The pattern shape of the non-deposition slits s, s1 is not particularly limited to the examples shown in the drawings, and various pattern shapes can be adopted.

In FIG. 1, non-deposition slits closest to the non-slit-forming region NA is shown as the non-deposition slits s1, and fuse portions closest to the non-slit-forming region NA are shown as the fuse portions fs1.

Here, the dielectric films 1A, 1B can be formed of, for example, polypropylene (PP), polyphenylene sulfide (PPS), polyethylene naphthalate (PEN), polyethylene terephthalate (PET), and polyvinylidene fluoride (PVDF).

The metal deposition films 2A, 2B can be formed by deposition of, for example, aluminum or zinc.

In the slit-forming regions VA of the metal deposition films 2A, 2B constituting the metallized films 3A, 3B, the plural non-deposition slits s, s1 are formed at intervals, and the fuse portions fs, fs1 having a small width are formed between end portions of the non-deposition slits s, s1. Thus, the slit-forming regions VA are divided into plural segments sg surrounded by the respective non-deposition slits s, s1.

As shown in FIG. 1, the two metallized films 3A, 3B are stacked such that the insulation margins mg thereof do not match with each other in a stacking direction, thereby forming a metallized film laminate 4 shown in FIG. 2.

The metallized film laminate 4 is stacked or wound. As a result, a metallized film columnar body 10 shown in FIG. 2 is formed. Metal sprayed portions 20 formed of, for example, aluminum or zinc are formed on two opposite electrode extraction surfaces of the metallized film columnar body 10, respectively. External lead-out terminals 40 formed of a rod-shaped or plate-shaped bus bar are connected to surfaces of the formed metal sprayed portions 20 through solder layers 30. As a result, a metallized film capacitor 100 is formed.

Returning to FIG. 1, on surfaces of the fuse portions fs1 closest to the non-slit-forming regions NA, insulating non-melting film 5 that do not melt due to heat generated from the fuse portions fs1 are formed by bonding or the like. In the examples shown in the drawings, the non-melting films 5 are formed only on top surfaces of the fuse portions fs1. However, the non-melting films 5 may be formed on both top and bottom surfaces of the fuse portions fs1.

Here, the non-melting films 5 are formed of a fine ceramic such as barium titanate ($BaTiO_3$), lead zirconate titanate ($Pb(Zr,Ti)O_3$), ferrite ($M^{2+}OFe_2O_3$), alumina ($Al_2O_3$), zirconia ($ZrO_2$), aluminum nitride (AlN), silicon nitride ($Si_3N_4$), or silicon carbide (SiC).

A thickness $t1$ of the non-melting films 5 is 0.3 μm or less. The present inventors discovered that, by using the non-melting films 5 having a thickness in the above-described range, corrugation is not likely to be formed on the dielectric films 1A, 1B having a thickness of 2 to 5 μm The melting point of the non-melting films 5 is equal to or higher than 1000° C. which is an evaporation temperature of aluminum as a general material for forming the metal deposition films 2A, 2B.

The dielectric constant of the non-melting films 5 is equal to or higher than that of the dielectric films 1A, 1B. As a result, a slight decrease in electrostatic capacitance can be prevented.

On the fuse portions fs1 on which thermal load is likely to be concentrated and which are closest to the non-slit-forming regions NA, the insulating non-melting films 5 that do not melt due to heat generated from the fuse portions fs1 are formed. As a result, continuous melting of the metallized films 3A, 3B in the stacked state can be eliminated, and short-circuiting caused by the melting of the metallized films 3A, 3B can be prevented.

(Second Embodiment of Metallized Films)

Figure 3:
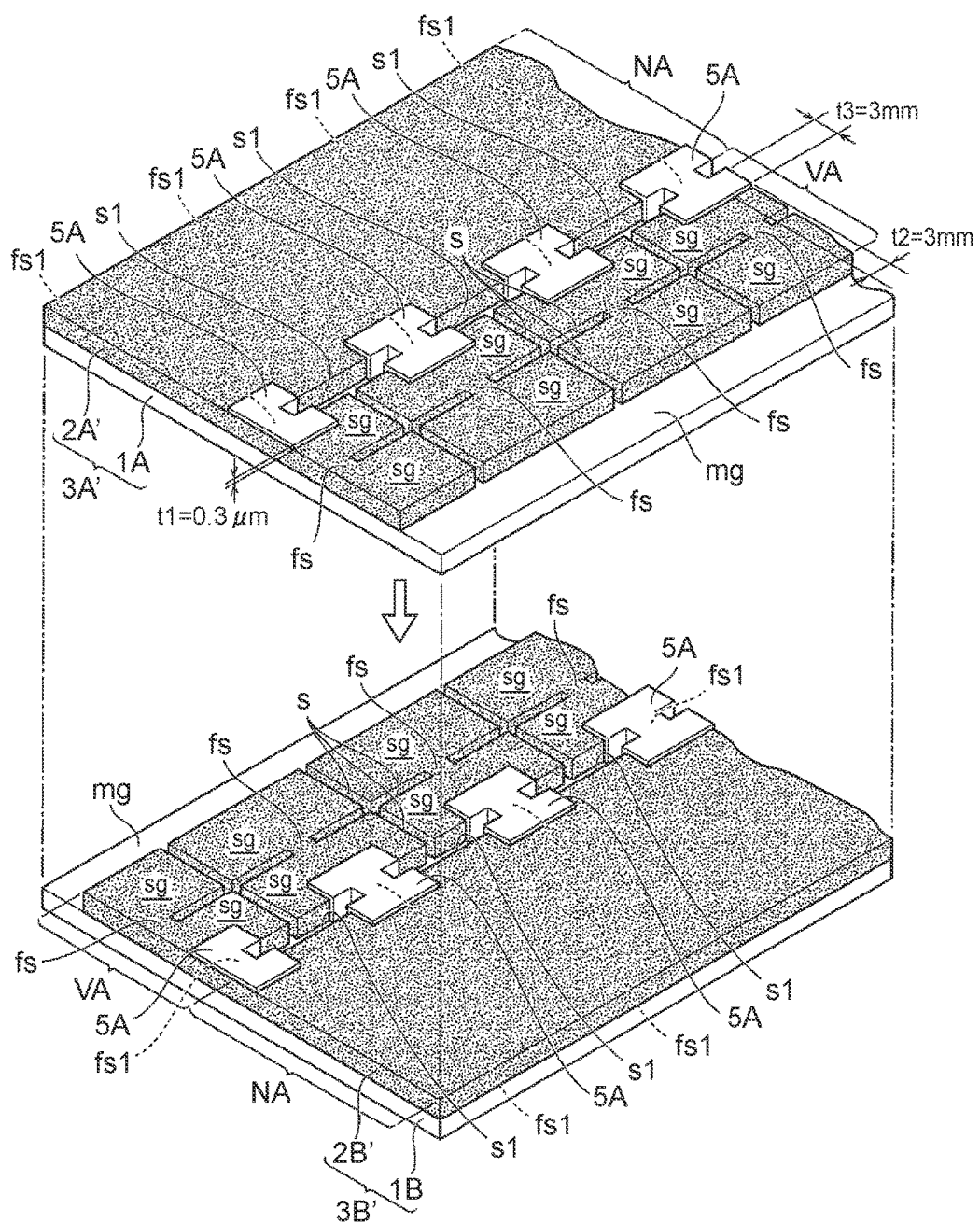
FIG. 3 is a schematic diagram showing a state of two metallized films constituting a metallized film capacitor according to a second embodiment of the disclosure before being stacked.

FIG. 3 is a schematic diagram showing a state of two metallized films according to a second embodiment before being stacked.

In metal deposition films 2A', 2B' for forming metallized films 3A', 3B' shown in the drawing, the non-melting films 5A are formed so as to cover not only the fuse portions fs1 but also regions (t2, t3) at a distance of 3 mm or more from the fuse portions fs1.

Actually, not only the fuse portions fs1 closest to the non-slit-forming regions NA but also the peripheries of the fuse portions fs1 may be regions on which a thermal load is concentrated. Therefore, by providing the non-melting films 5A which also cover the regions (t2, t3) at a distance of 3 mm or more from the fuse portions fs1, melting of the metallized films 3A', 3B' caused by the concentration of the thermal load on the fuse portions fs1 and the peripheries of the fuse portions fs1 can be prevented. The distance of 3 mm is defined as a required range based on the area of the metal deposition films 2A, 2B' evaporated during breakdown.

(Third Embodiment of Metallized Films)

Figure 4:
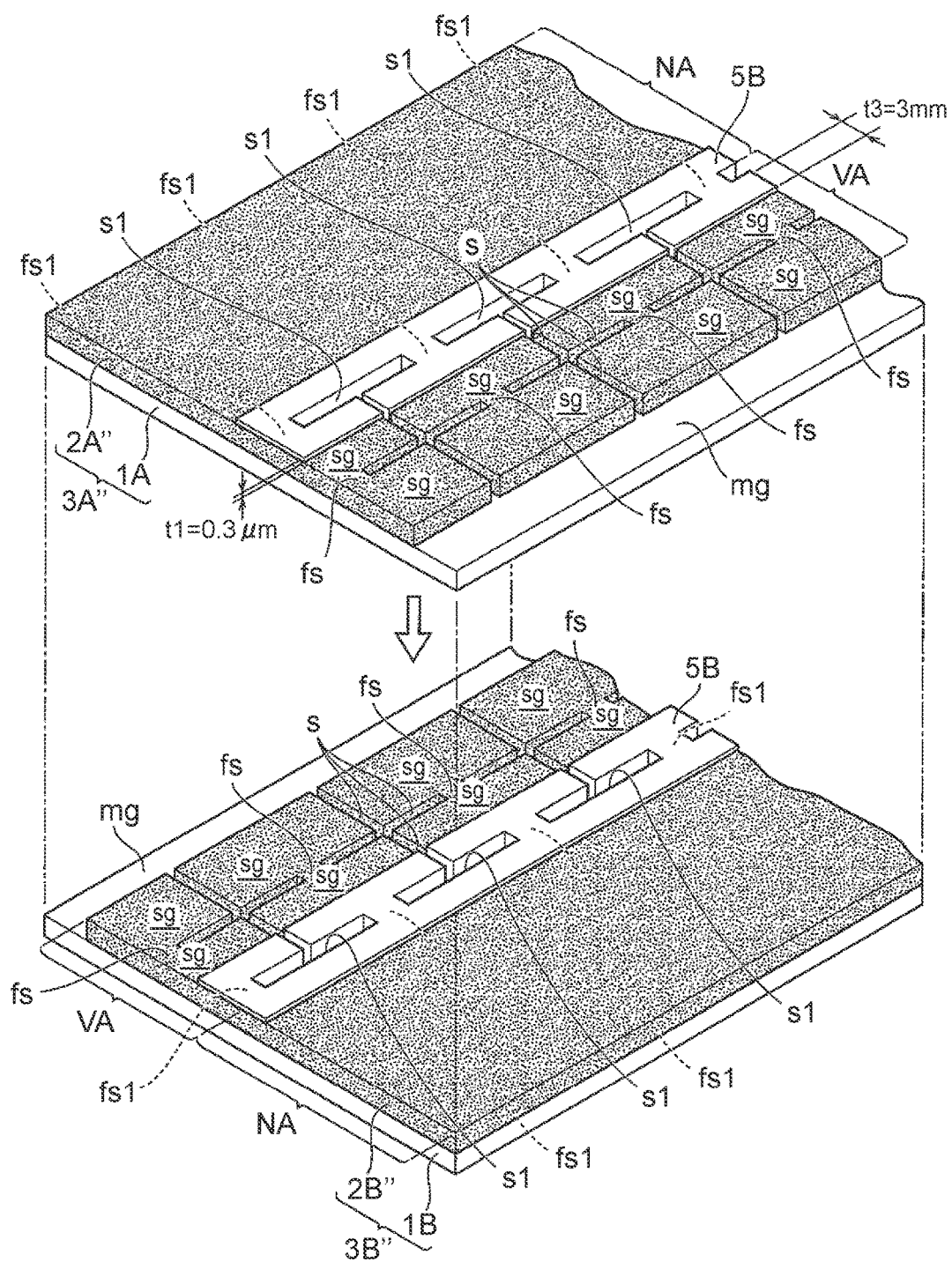
FIG. 4 is a schematic diagram showing a state of two metallized films constituting a metallized film capacitor according to a third embodiment of the disclosure before being stacked.
Figure 5:
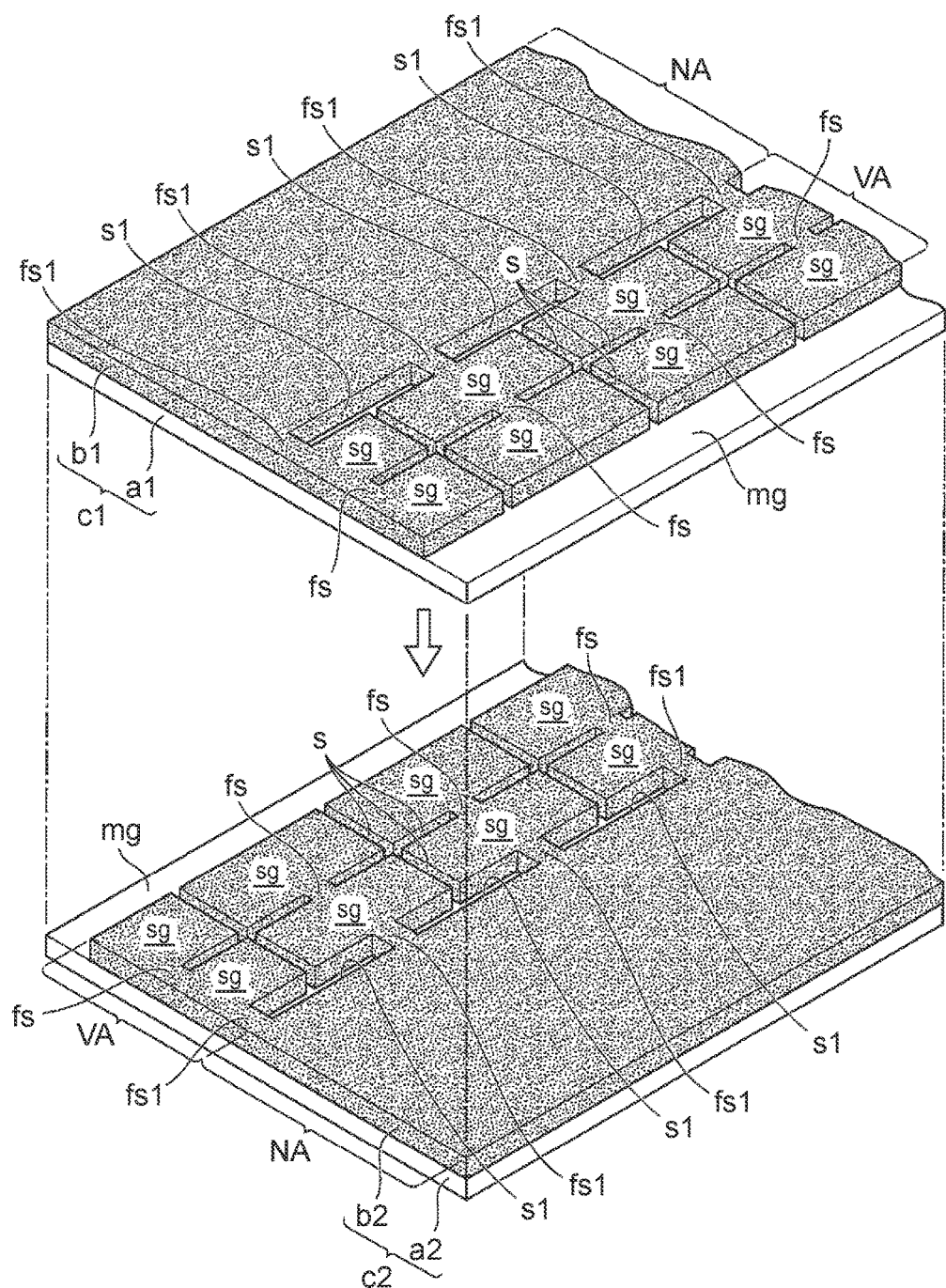
FIG. 5 is a schematic diagram showing a state of two metallized films constituting a metallized film capacitor of the related art before being stacked.
Figure 6:
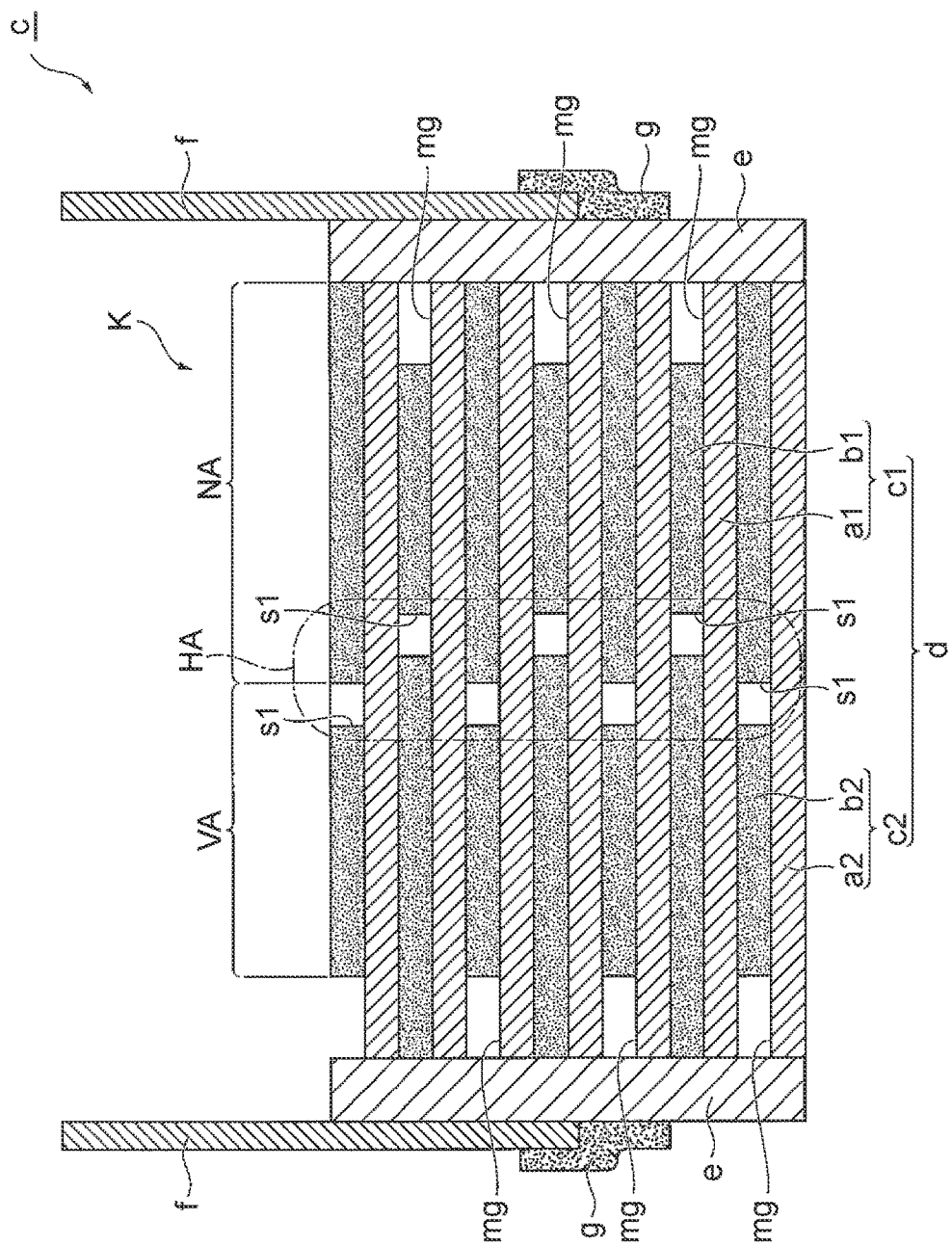
FIG. 6 is a longitudinal sectional view showing the metallized film capacitor of the related art.

FIG. 4 is a schematic diagram showing a state of two metallized films according to a third embodiment before being stacked.

In metal deposition films 2A", 2B" for forming metallized films 3A", 3B" shown in the drawing, each of belt-shaped non-melting films 5B is formed so as to cover the plural fuse portions fs1 closest to the non-slit-forming region NA.

The belt-shaped non-melting film 5B also covers regions (t3) at a distance of 3 mm or more from the fuse portions fs1.

(Verification Based on Physical Properties of Materials)

The present inventors verified whether or not a dielectric film melted when heat generated during breakdown evaporated a metal deposition film and was transmitted to the dielectric film, that is, verified whether or not a non-melting film melted when heat applied to an aluminum evaporation film was applied to the non-melting film. The physical properties of the metal deposition film, the non-melting film, and the dielectric film used in the verification are shown in Table 1 below.

TABLE 1

|  | Density (g/cm$^3$) | Molar Mass (g/mol) | Specific Heat (kJ/(kgK)) | Melting Point (° C.) | Boiling Point (° C.) | Thickness (μm) |
| --- | --- | --- | --- | --- | --- | --- |
| Metal Deposition Film (Aluminum) | 2.7 | 27 | 0.9 | 660 | 2500 | 0.02 |
| Non-Melting Film (Alumina) | 4.0 | 102 | 0.8 | 2070 | 3000 | 0.2 |
| Dielectric Film (PVDF) | 1.8 | 103 | 1.2 | 160 | — | 2.0 |

Here, the volume of the non-melting film to which heat is applied was greater than that of the metal deposition film, that is, an increase in the temperature of the non-melting film was less than that of the metal deposition film (in general, the thickness of a metal deposition film is several nanometers to several tens of nanometers, and the particle size of a material of a non-melting film is several hundreds of nanometers).

The melting point of the non-melting film was higher than that of the metal deposition film (in general, the melting point of a ceramic is higher than that of a metal).

It can be seen from the above results that, since the non-melting film does not melt, so-called multi-layer melting of the metallized film can be eliminated, and self-healing properties of a metallized film capacitor can be secured.

Hereinabove, the embodiments of the disclosure have been described with reference to the drawings. However, a specific configuration is not limited to the embodiments, and design changes and the like which are made within a range not departing from the scope of the invention are included in the invention.

What is claimed is:

1. A metallized film capacitor comprising:
   a metallized film columnar body in which metallized films are stacked or wound, the metallized film columnar body comprising
     (i) a metal deposition film comprising (a) a non-slit-forming region that does not includes a non-deposition slit and (b) a slit-forming region including plural non-deposition slits and fuse portions that are present between the non-deposition slits,
     (ii) insulating non-melting films that are provided on at least the fuse portions closest to the non-slit-forming region and do not melt due to heat generated from fuse portions, and
     (iii) a dielectric film,
   an external lead-out terminal; and
   a metal sprayed portion to which the external lead-out terminal is joined and that is provided in the metallized film columnar body,
   wherein the insulating non-melting films do not melt at an evaporation temperature of the metal deposition film.

2. The metallized film capacitor according to claim 1, wherein the non-melting films cover the fuse portions closest to the non-slit-forming region and regions at a distance of 3 mm or more from the fuse portions closest to the non-slit-forming region.

3. The metallized film capacitor according to claim 1, wherein each of the non-melting films has a belt shape and covers plural fuse portions closest to the non-slit-forming region.

4. The metallized film capacitor according to claim 1, wherein a thickness of the non-melting films is 0.3 μm or less.

5. The metallized film capacitor according to claim 1, wherein a melting point of the non-melting films is 1000° C. or higher.

6. The metallized film capacitor according to claim 1, wherein a dielectric constant of the non-melting films is equal to or higher than a dielectric constant of the dielectric film.

* * * * *